No. 828,292. PATENTED AUG. 7, 1906.
E. W. SCHNEIDER.
POCKET AUDIPHONE.
APPLICATION FILED DEC. 8, 1905.
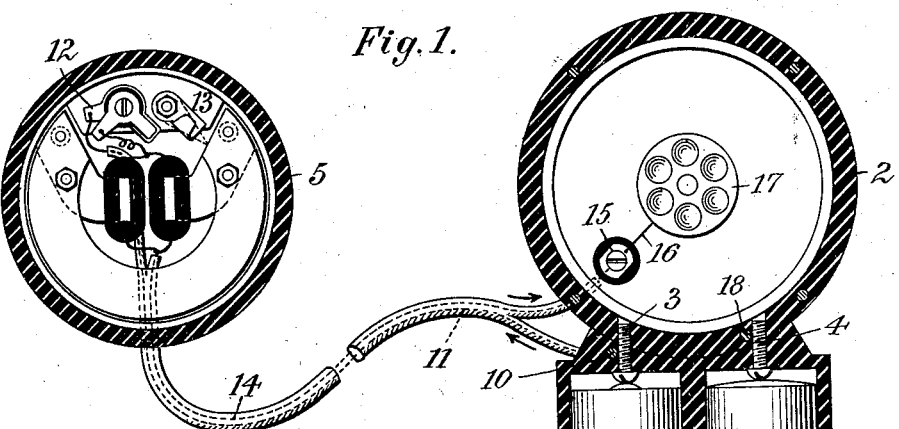
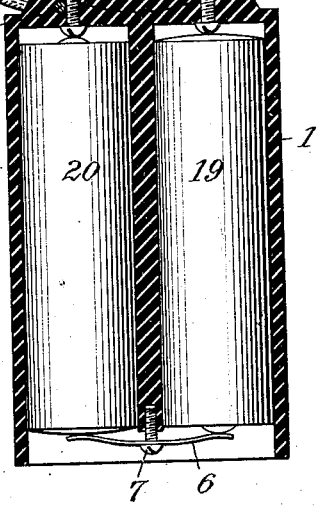
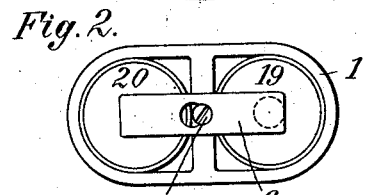
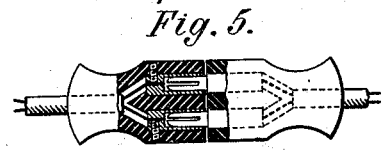
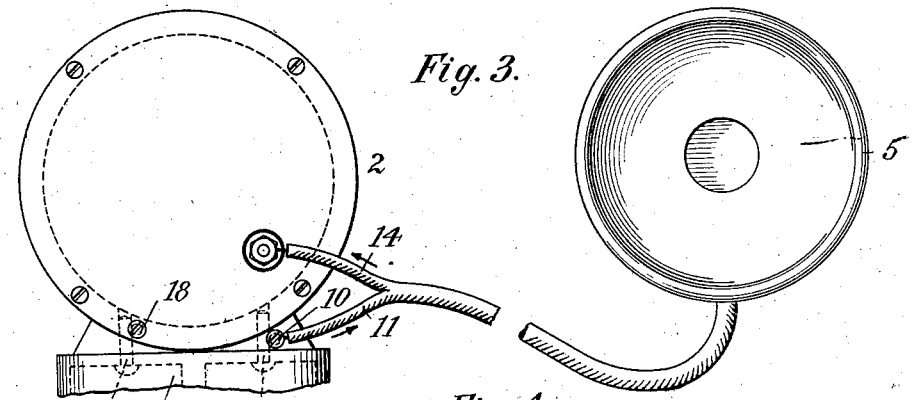
Witnesses
Inventor
Eugene William Schneider
By his Attorney

ID OF PATENT OFFICE.

EUGENE WILLIAM SCHNEIDER, OF NEW YORK, N. Y.

POCKET-AUDIPHONE.

No. 828,292. Specification of Letters Patent. Patented Aug. 7, 1906.

Original application filed August 11, 1905, Serial No. 274,017. Divided and this application filed December 8, 1905, Serial No. 290,931.

*To all whom it may concern:*

Be it known that I, EUGENE WILLIAM SCHNEIDER, a citizen of the United States, residing in the borough of Manhattan, city, county, and State of New York, have invented certain new and useful Improvements in Pocket-Audiphones, of which the following is a specification, this being a division of application filed August 11, 1905, Serial No. 274,017.

My invention relates to improvements in pocket-audiphones for aiding the deaf in hearing, by means of which such audiphones may be made more compact and simplified, so as to do away with a multiplicity of loose connections which complicate the instrument and make it unhandy for pocket use.

In pocket-audiphones as usually constructed the battery is detached from the transmitter and is connected to it by conducting-cords which are subject to strains or may become twisted to such an extent that they are frequently broken and the usefulness of the instrument is destroyed. In order to remedy this defect, I place the battery in a rigid case practically closed at one end, so that the cells may be maintained solidly against this end by a restraining member placed at the other end and the transmitter being connected to the closed end of the case in such manner that the battery and the transmitter form substantially one solid body, the electrical connections between the two being rigid and reduced to their simplest expression.

The accompanying drawings show an apparatus suitable to the carrying out of my invention, although I do not limit myself to the exact construction shown, as changes may be made in the apparatus without changing its mode of operation or the effect produced.

Figure 1 is a cross-section through the battery, showing the transmitter in place with its connections with the cells and earpiece, the front being removed and the earpiece being shown in section. Fig. 2 is a plan view of the open end of the battery-case with the cells in place. Fig. 3 is a partial rear elevation of the apparatus, showing the transmitter in place with outside flexible connections to the earpiece. Figs. 4 and 5 show modifications in the manner of interrupting the current.

The device consists of battery-case 1, closed at one end and divided into two compartments of sufficient size to hold the cells. The top of the battery-case is closed, and the transmitter 2 is connected to the case and to the cells by means of metallic screws 3 and 4. An earpiece or receiver 5 is connected to the transmitter by the usual wiring. The batteries are maintained in place by means of a spring 6, which slides under screw 7 and may be detached when the cells are to be replaced.

The operation of the device will be easily understood. The current developed in the batteries 19 and 20 passes through the upper end of the battery-case, through screw 3, and hence to screw 10, which forms an outer binding-post to which the wire 11, leading to the earpiece, is attached. This wire properly divided distributes the current between the electromagnets of the earpiece, which are thus connected in parallel. The current then passes out of the magnets through the leading-out wires, as shown on Fig. 1. These wires are connected with one of the plates of a switch 12, the closing member of which is the knife 13. The return-wire 14 is attached to the other plate of the switch, from which it is properly insulated, and leads the current to binding-post 15, which extends through the metallic back of the transmitter and from which it is insulated. The circuit continues from binding-post 15 through internal wire 16 to electrode 17. From the electrode the current passes to the diaphragm and from the diaphragm to the metallic back of the transmitter, then from screw 18 to screw 4, and back to the negative end of the battery 19.

The manner in which the sound-waves striking the diaphragm of the transmitter are reproduced to the ear by the receiver will be easily understood.

I have shown a current-interrupter in the earpiece; but this may be placed in any convenient point of the circuit—as, for instance, in the wires connecting the transmitter to the earpiece, as shown in Fig. 5, where wire 14 is provided with female plug 22 and male plug 23. To close the circuit, plug 23 is placed in plug 22. When the plugs are disconnected, the current may also be interrupted by placing double male and female plugs at some point of the cord connection between the transmitter and the earpiece, as shown in Fig. 5. It will easily be understood that by pulling the male plugs out of contact the current will be broken, the earpiece becoming entirely detached from the transmitter and batteries.

I do not claim any special kind of transmitter or earpiece.

What I claim is—

In a pocket-audiphone, a battery-case made of insulating material and containing a battery, a transmitter rigidly attached to one end of the battery-case and exterior thereto, rigid electrical connections between the battery and the transmitter, a receiver, and flexible connections connecting the receiver directly to the transmitter.

In witness whereof I affix my signature in the presence of two witnesses.

EUGENE WILLIAM SCHNEIDER.

Witnesses:
R. R. MENEN,
J. T. VAN LOAN.